United States Patent
Hata et al.

(10) Patent No.: US 7,164,099 B2
(45) Date of Patent: Jan. 16, 2007

(54) MULTI-AXIS LASER MACHINE, METHOD FOR MACHINING WITH THE SAME, AND RECORDING MEDIUM RECORDING COMPUTER PROGRAM FOR CONTROLLING THE SAME

(75) Inventors: Izumi Hata, Ebina (JP); Toshiya Nishimura, Ebina (JP); Hidenori Tateishi, Ebina (JP); Yasuyuki Shimizu, Ebina (JP); Tetsuo Murakami, Ebina (JP)

(73) Assignee: Hitachi Via Mechancis Ltd., Ebina (JP)

( * ) Notice: Subject to any disclaimer, the term of this patent is extended or adjusted under 35 U.S.C. 154(b) by 208 days.

(21) Appl. No.: 10/735,858

(22) Filed: Dec. 16, 2003

(65) Prior Publication Data
US 2004/0173590 A1    Sep. 9, 2004

(30) Foreign Application Priority Data
Dec. 17, 2002    (JP)    ............................. 2002-365586

(51) Int. Cl.
*B23K 26/00*    (2006.01)
*B23K 26/02*    (2006.01)
(52) U.S. Cl. .............................. 219/121.79; 219/121.77
(58) Field of Classification Search ................ 219/121, 219/121.6–121.79
See application file for complete search history.

(56) References Cited

U.S. PATENT DOCUMENTS

| 5,302,798 | A | * | 4/1994 | Inagawa et al. | ......... | 219/121.7 |
| 6,034,349 | A | * | 3/2000 | Ota | ........................ | 219/121.73 |
| 6,086,366 | A | * | 7/2000 | Mueller et al. | ................ | 433/29 |
| 6,180,913 | B1 | * | 1/2001 | Kolmeder et al. | ..... | 219/121.68 |
| 6,521,866 | B1 | | 2/2003 | Arai et al. | | |
| 6,605,796 | B1 | * | 8/2003 | Brandinger et al. | ... | 219/121.67 |

FOREIGN PATENT DOCUMENTS

JP    2000-263271    9/2000

* cited by examiner

*Primary Examiner*—James Menefee
*Assistant Examiner*—Phillip Nguyen
(74) *Attorney, Agent, or Firm*—Crowell & Moring LLP

(57) ABSTRACT

A multi-axis laser machine in which the working efficiency can be improved even when machining positions in respective systems are different from each other. The positioning operation of a laser positioning unit for positioning an optical path of a laser beam in an axis and the positioning operation of another laser positioning unit for positioning another optical path of the laser beam in another axis are performed independently of each other. An arbitration unit monitors the laser positioning units as to whether they have finished positioning or not. The arbitration unit operates a deflection unit (AOM) so as to supply the laser beam to one of the laser positioning units which has finished positioning. Incidentally, when the laser positioning units finish positioning simultaneously, the arbitration unit supplies the laser beam to the laser positioning units in a predetermined sequence.

3 Claims, 5 Drawing Sheets

MULTI-AXIS LASER MACHINE, METHOD FOR MACHINING WITH THE SAME, AND RECORDING MEDIUM RECORDING COMPUTER PROGRAM FOR CONTROLLING THE SAME

BACKGROUND OF THE INVENTION

The present invention relates to a so-called multi-axis laser machine in which a laser beam outputted from one laser oscillator is supplied to a plurality of machining heads, and the laser beam is positioned for each machining head to machine a subject to be machined, a method for machining with the laser machine, and a recording medium recording a computer program for controlling the laser machine.

For example, a two-axis laser machine in the background art having two machining heads is provided with two laser oscillators, and optical paths from the laser oscillators to a final subject to be machined are provided. In the two-axis laser machine configured thus, each axis can be controlled substantially independently. Thus, the efficiency in machining is approximately twice as high as that of a one-axis laser machine. However, the equipment cost and the maintenance cost are increased because the two laser oscillators are used.

There is another two-axis laser machine in which a laser beam outputted from one laser oscillator is made to branch into two optical paths by means of a half mirror. In the two-axis laser machine configured thus, the equipment cost can be reduced in comparison with the aforementioned one.

However, since the laser beams of the two optical paths are supplied concurrently, the operations of laser positioning units for the two optical paths have to be finished before the laser beams are supplied. That is, one optical path positioned earlier has to wait for the other optical path to be positioned. Therefore, it cannot be said that the machining efficiency is improved.

According to the invention disclosed in JP-A-2000-263271, therefore, a two-axis laser machine is designed so that a laser beam outputted from one laser oscillator is deflected in two directions with deflection devices (acousto-optic devices). In the two-axis laser machine configured thus, it is claimed that not only can the equipment unit cost be reduced, but the operating rate of the laser oscillator can be also improved.

However, in the invention disclosed in JP-A-2000-263271, it is assumed that all the optical paths have an equal laser positioning time and an equal laser output time.

Generally, in most cases, the machining position in one optical path differs from that in the other optical path. Therefore, the maximum value of the time required for positioning has to be set as the positioning time. Thus, it cannot be said that the working efficiency is improved.

SUMMARY OF THE INVENTION

To solve the foregoing problems in the background art, it is an object of the present invention to provide a multi-axis laser machine in which the working efficiency can be improved even when machining positions in respective optical paths differ from one another, a method for machining with the laser machine, and a recording medium recording a control program for machining with the laser machine.

In order to attain the foregoing objects, a multi-axis laser machine according to the present invention includes a laser oscillator for outputting a laser beam, a deflection unit for switching a plurality of optical paths for the laser beam, and laser positioning units disposed on the optical paths respectively, the number of the laser positioning units being equal to the number of the optical paths. The laser beam is supplied to any one of the laser positioning units to thereby perform machining. The laser machine further includes an arbitration unit for controlling the laser positioning units independently of one another, supplying the laser beam to one of the laser positioning units which has finished positioning, and supplying the laser beam to a plurality of laser positioning units in a predetermined sequence when the laser positioning units finish positioning simultaneously.

In addition, in machining with the multi-axis laser machine, the laser positioning units are controlled independently of one another. As soon as one of the laser positioning units finishes positioning, the laser beam is supplied to the laser positioning unit finishing positioning. When a plurality of laser positioning units finish positioning simultaneously, the laser beam is supplied to the laser positioning units in a predetermined sequence.

Such a control can be designed to allow a computer to execute a computer program including the steps of: controlling the laser positioning units independently of one another; supplying the laser beam to one of the laser positioning units as soon as the laser positioning unit finishes positioning; and supplying the laser beam to a plurality of laser positioning units in a predetermined sequence when the laser positioning units finish positioning simultaneously.

In that event, for example, the program data can be downloaded for use from a server through a network, or from CD-ROM or various memory cards through a recording medium drive unit.

According to the present invention, even if the machining positions of the respective axes are different from one another, the wait time can be minimized so that the machining efficiency can be improved.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF PREFERRED EMBODIMENTS

Embodiments of the present invention will be described below with reference to the drawings.

Figure 1:
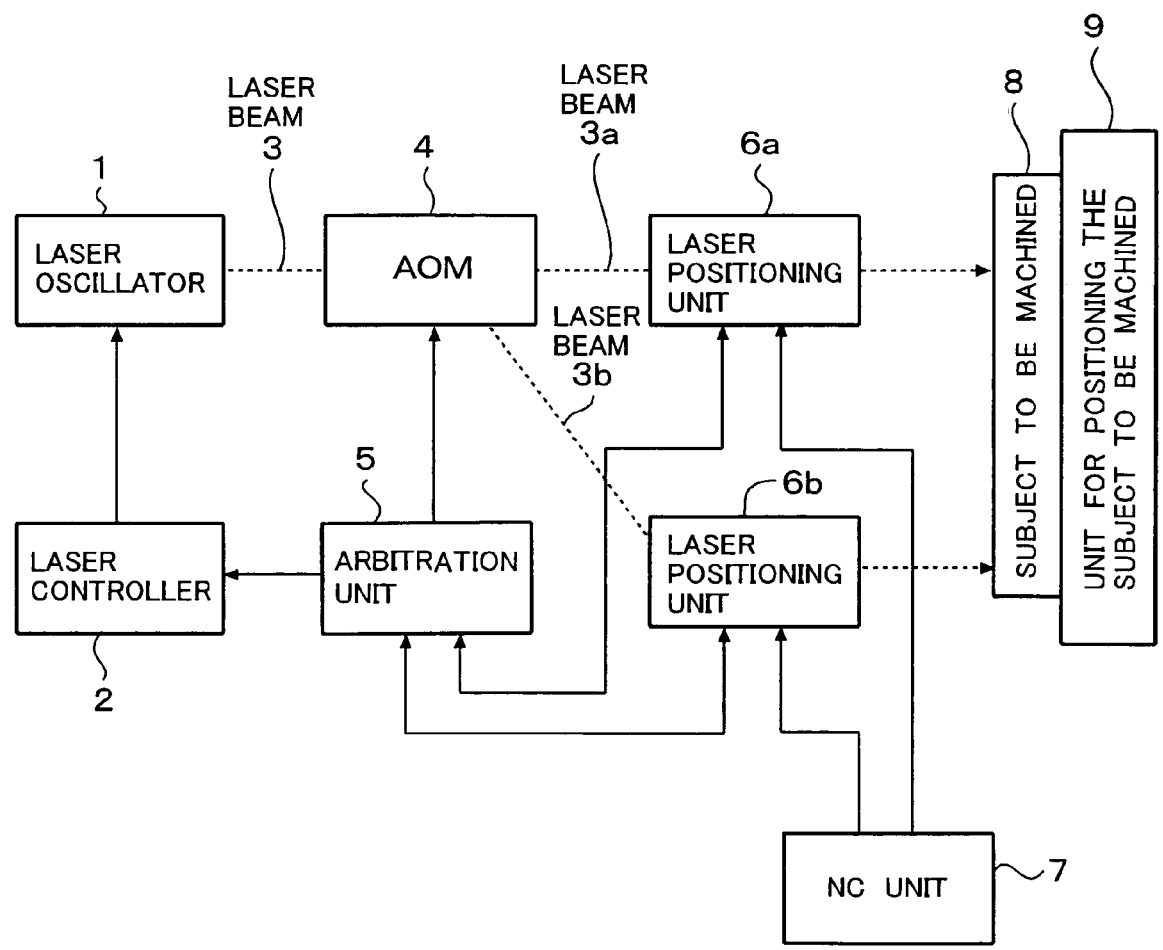
FIG. 1 is a configuration diagram of a laser machine according to an embodiment of the present invention.

FIG. 1 is a configuration diagram of a two-axis laser machine according to an embodiment of the present invention.

A laser controller 2 controls the output of a laser oscillator 1 in accordance with a signal from an arbitration unit 5. An acousto-optic modulator (hereinafter referred to as "AOM") 4 is disposed on an optical path (shown by the broken line in FIG. 1) of a laser beam 3 to be outputted from the laser oscillator 1. In response to a control signal supplied from the arbitration unit 5, the AOM 4 deflects the incident laser beam 3 at an angle □. Otherwise the AOM 4 transmits the laser beam 3 as it is. (The transmitted laser beam 3 will be referred to as "laser beam 3a", and the deflection-side laser beam 3, that is, the laser beam 3 deflected at an angle □will be referred to as "laser beam 3b".)

A laser positioning unit 6a retained in a first axis J1 is disposed on the optical path of the laser beam 3a. On the other hand, a laser positioning unit 6b retained in a second axis J2 is disposed on the optical path of the laser beam 3b. The laser positioning units 6a and 6b are connected to the arbitration unit 5 and an NC unit 7. A subject to be machined 8 is fixed on a unit 9 for positioning a subject to be machined.

Next, the operation of each part will be described.

Figure 2:
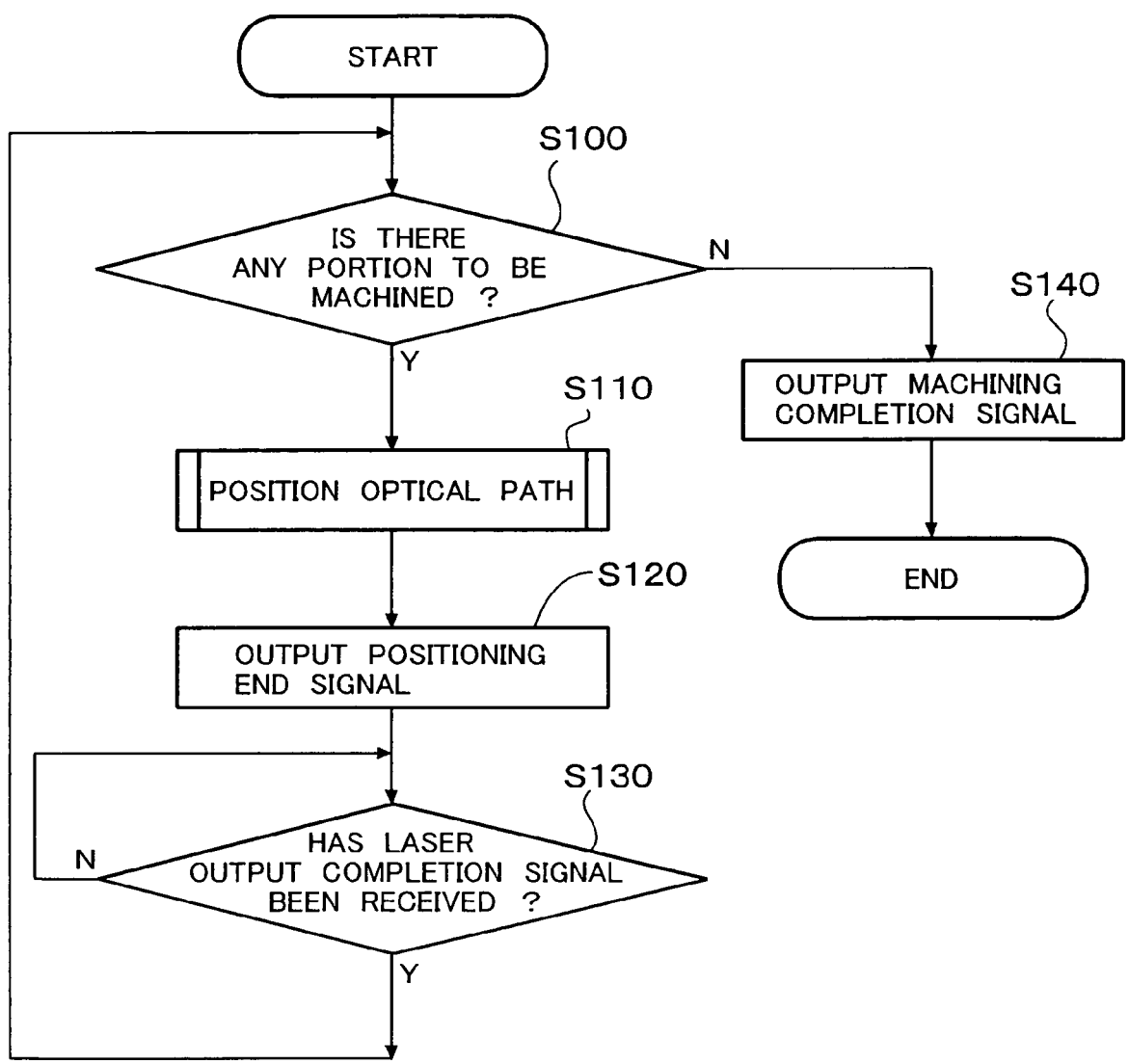
FIG. 2 is a flow chart showing the operation of a laser positioning unit according to the embodiment of the present invention.

FIG. 2 is a flow chart showing the operation of the laser positioning unit 6a (that is, the axis J1).

When a not-shown start button is turned on, the laser positioning unit 6a identifies the coordinates of a portion to be machined instructed by the NC unit 7 (Step S100). When there is a subsequent portion to be machined, the laser positioning unit 6a performs the processing of Step S110. Otherwise the laser positioning unit 6a supplies a machining completion signal to the NC unit 7 (Step S140), and then terminates the routine of processing. In Step S110, a not-shown mechanism portion of the laser positioning unit 6a is operated to position the optical path of the laser beam 3a. When the positioning is terminated, a positioning end signal is supplied to the arbitration unit 5 (Step S120). Then, the laser positioning unit 6a waits to receive a laser output completion signal outputted from the arbitration unit 5 (Step S130). Receiving the laser output completion signal, the laser positioning unit 6a performs the processing of Step S100.

The laser positioning unit 6b (that is, the axis J2) performs the processing of Steps S100 to S140 in the same manner as the laser positioning unit 6a. Incidentally, the laser positioning units 6a and 6b perform the processing of Steps S100 to S140 independently of each other.

Figure 3:
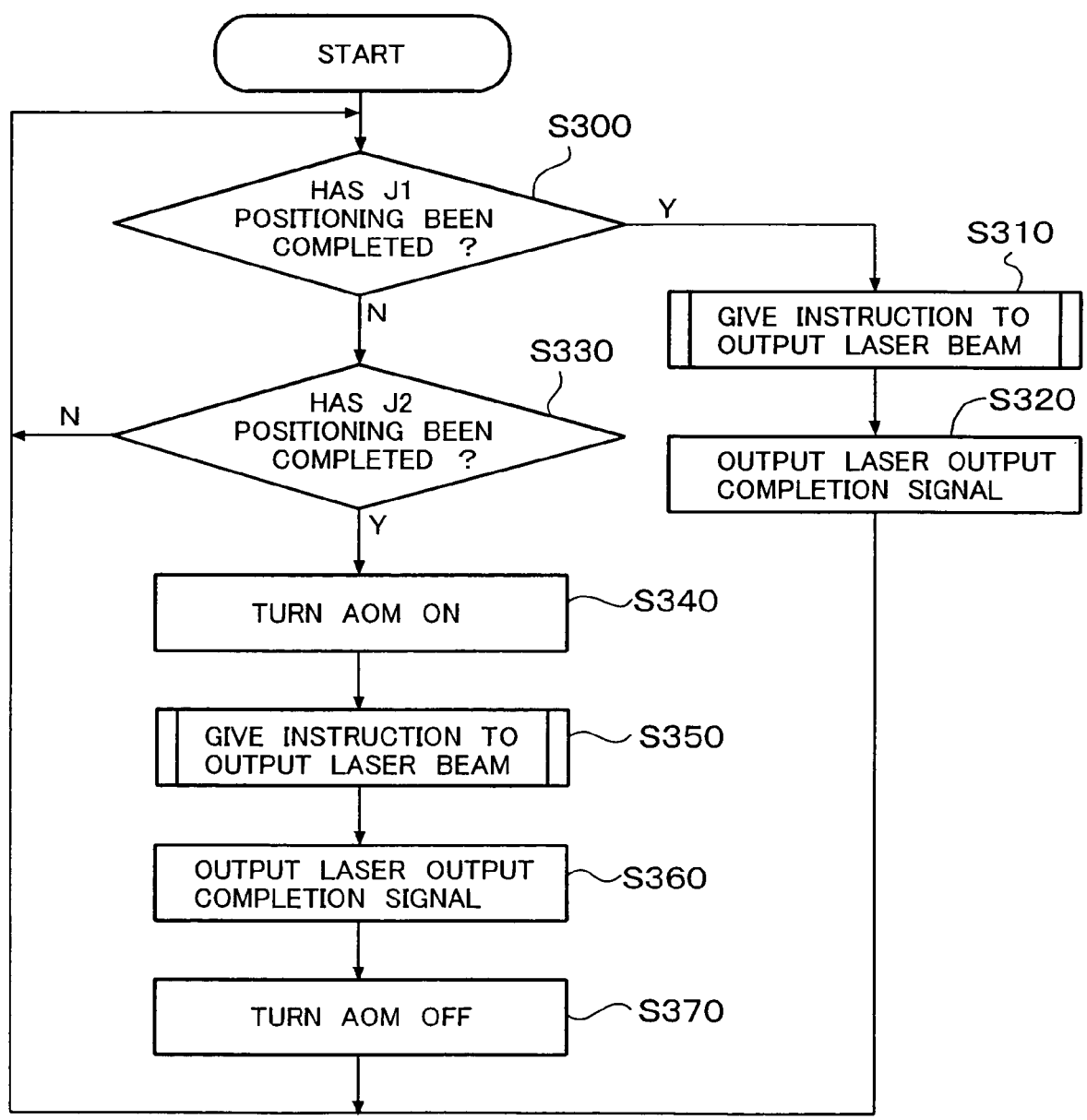
FIG. 3 is a flow chart showing the operation of an arbitration unit according to the embodiment of the present invention.

FIG. 3 is a flow chart showing the operation of the arbitration unit 5.

When a not-shown start button is turned on, the arbitration unit 5 confirms whether the laser positioning unit 6a has finished positioning or not (Step S300). When the laser positioning unit 6a has finished positioning, the arbitration unit 5 performs the processing of Step S310. Otherwise the arbitration unit 5 performs the processing of Step S330. In Step S310, the arbitration unit 5 gives the laser controller 2 an instruction to output the laser beam 3 and perform irradiation with the laser beam 3 a predetermined number of times. Then, when the irradiation of the laser beam 3 is completed, the arbitration unit 5 supplies a laser output completion signal to the laser positioning unit 6a (Step S320), and performs the processing of Step S300.

On the other hand, in Step S330, the arbitration unit 5 confirms whether the laser positioning unit 6b has finished positioning or not. When the laser positioning unit 6b has finished positioning, the arbitration unit 5 performs the processing of Step S340. Otherwise the arbitration unit 5 performs the processing of Step S300. In Step S340, the arbitration unit 5 turns on the AOM 4, and then gives the laser controller 2 an instruction to output the laser beam 3 and perform irradiation with the laser beam 3 a predetermined number of times (Step S350). Then, when the irradiation with the laser beam 3 is completed, the arbitration unit 5 supplies a laser output completion signal to the laser positioning unit 6b (Step S360). After that, the arbitration unit 5 turns off the AOM 4 (Step S370) and performs the processing of Step S300.

The procedures of the laser positioning units 6a and 6b and the procedure of the arbitration unit 5 are executed by CPUs provided in those units in accordance with programs stored in ROMs provided in those units and by use of RAMs provided in those units as work areas, respectively.

Next, the operation of the machine as a whole will be described.

When a not-shown start button is turned on, the NC unit 7 gives instructions of machining positions to the laser positioning units 6a and 6b respectively. The laser positioning units 6a and 6b receiving the instructions position the optical paths of the laser beams 3a and 3b in the machining positions on the subject to be machined 8 based on the data instructed by the NC unit 7, respectively. When the positioning is terminated, the laser positioning units 6a and 6b output positioning end signals to the arbitration unit 5 respectively.

For example, assume that the positioning of the laser positioning unit 6a is terminated prior to the positioning of the laser positioning unit 6b. The arbitration unit 5 receiving a positioning end signal from the laser positioning unit 6a operates the laser controller 2 so as to allow the laser oscillator 1 to output the laser beam 3. Since the AOM 4 is off, the laser beam 3a is put into the laser positioning unit 6a, and the machining position on the subject to be machined 8 is irradiated with the laser beam 3a. When the irradiation with the laser beam 3a is completed, the laser positioning unit 6a receiving a laser output completion signal from the arbitration unit 5 starts the operation for positioning the optical path of the laser beam 3a in the next machining position.

Next, assume that the positioning of the laser positioning unit 6b is terminated (while the laser positioning unit 6a is busy with positioning). The arbitration unit 5 receiving a positioning end signal from the laser positioning unit 6b turns on the AOM 4, and then operates the laser controller 2 so as to allow the laser oscillator 1 to output the laser beam 3. Since the AOM 4 is on, the laser beam 3b is put into the laser positioning unit 6b, and the machining position on the subject to be machined 8 is irradiated with the laser beam 3b. When the irradiation with the laser beam 3b is completed, the laser positioning unit 6b receiving a laser output completion signal from the arbitration unit 5 starts the operation for positioning the optical path of the laser beam 3b in the next machining position. Subsequently, the aforementioned operation is repeated till machining is completed.

Incidentally, as is apparent from the aforementioned flow chart, when one of the laser positioning units 6a and 6b finishes positioning while the other is busy with machining, the former has to wait till the latter finishes the machining. In addition, when both the laser positioning units 6a and 6b finish positioning simultaneously, the laser positioning unit 6a (that is, the axis J1) is given priority.

In such a manner, the laser beam 3 is supplied to one of the axes whose optical path has been positioned. Thus, the operating rate of the laser oscillator can be improved.

In this embodiment, the pulse form of the laser beam 3a, 3b emitted onto a subject to be machined is substantially the same as the pulse form of the laser beam 3 outputted from the laser oscillator 1. As will be described later, the intensity of the laser beam 3 is not constant. Therefore, for example, pulse shapers may be disposed between the AOM 4 and the laser positioning unit 6a and between the AOM 4 and the laser positioning unit 6b respectively so that the intensity of the laser beam 3 can be controlled. With such a configuration, the machining quality or the machined shape can be improved.

Figure 4:
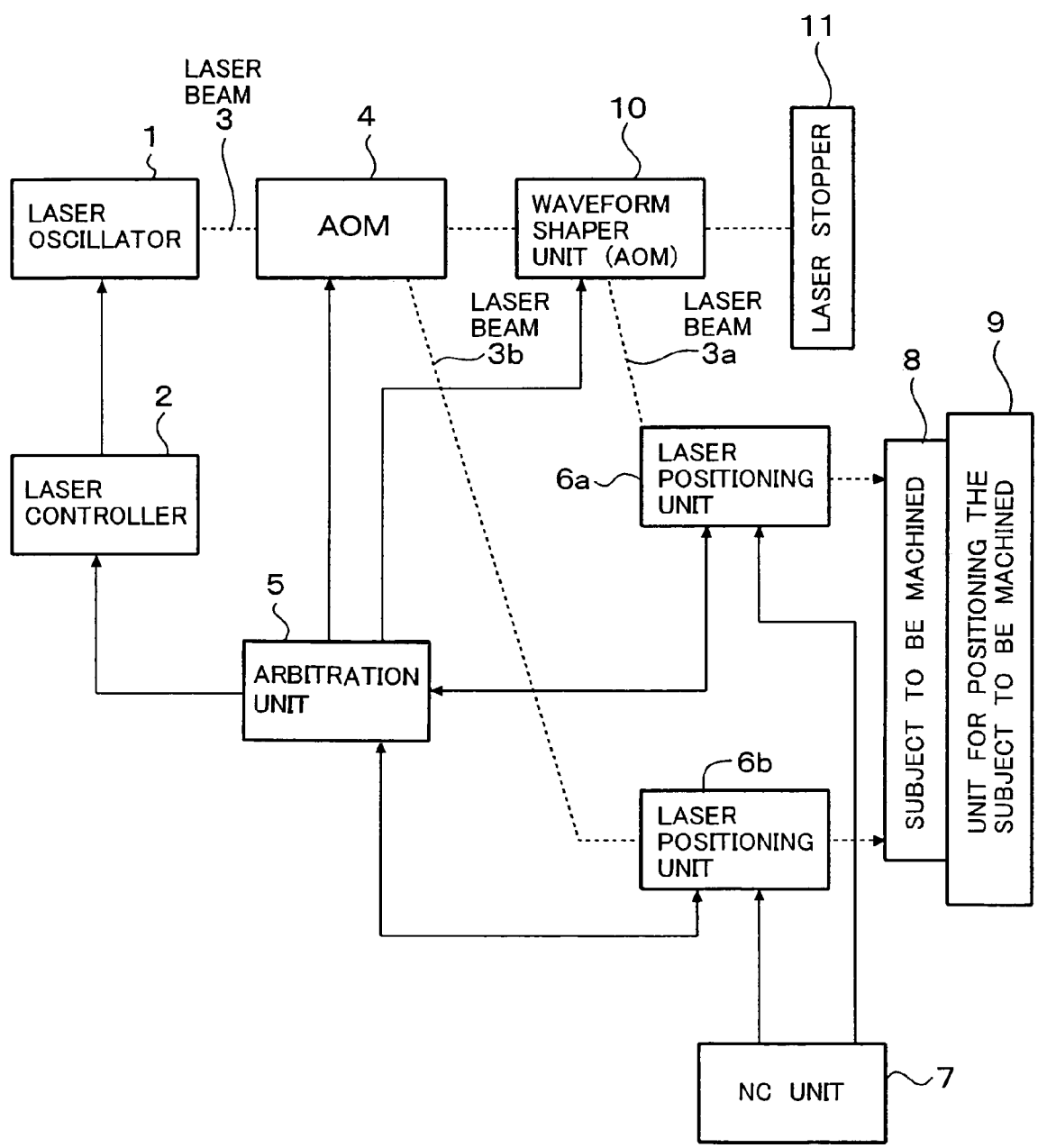
FIG. 4 is a configuration diagram of a laser machine showing a modification of the embodiment of the present invention.

FIG. 4 is a configuration diagram of a laser machine showing a modification of the present invention. In FIG. 4, parts the same as or having the same functions as those in FIG. 1 are denoted by the same reference numerals correspondingly, and their description will be omitted.

A pulse shaper (AOM here) 10 is disposed at the rear of the AOM 4 on the optical path of the laser beam 3, and a laser stopper 11 is disposed at the rear of the AOM 10. The AOM 10 is connected to the arbitration unit 5. The laser positioning unit 6a is disposed on the deflection side of the AOM 10, while the laser positioning unit 6b is disposed on the deflection side of the AOM 4.

Next, the operation of this embodiment will be described.

Figure 5:
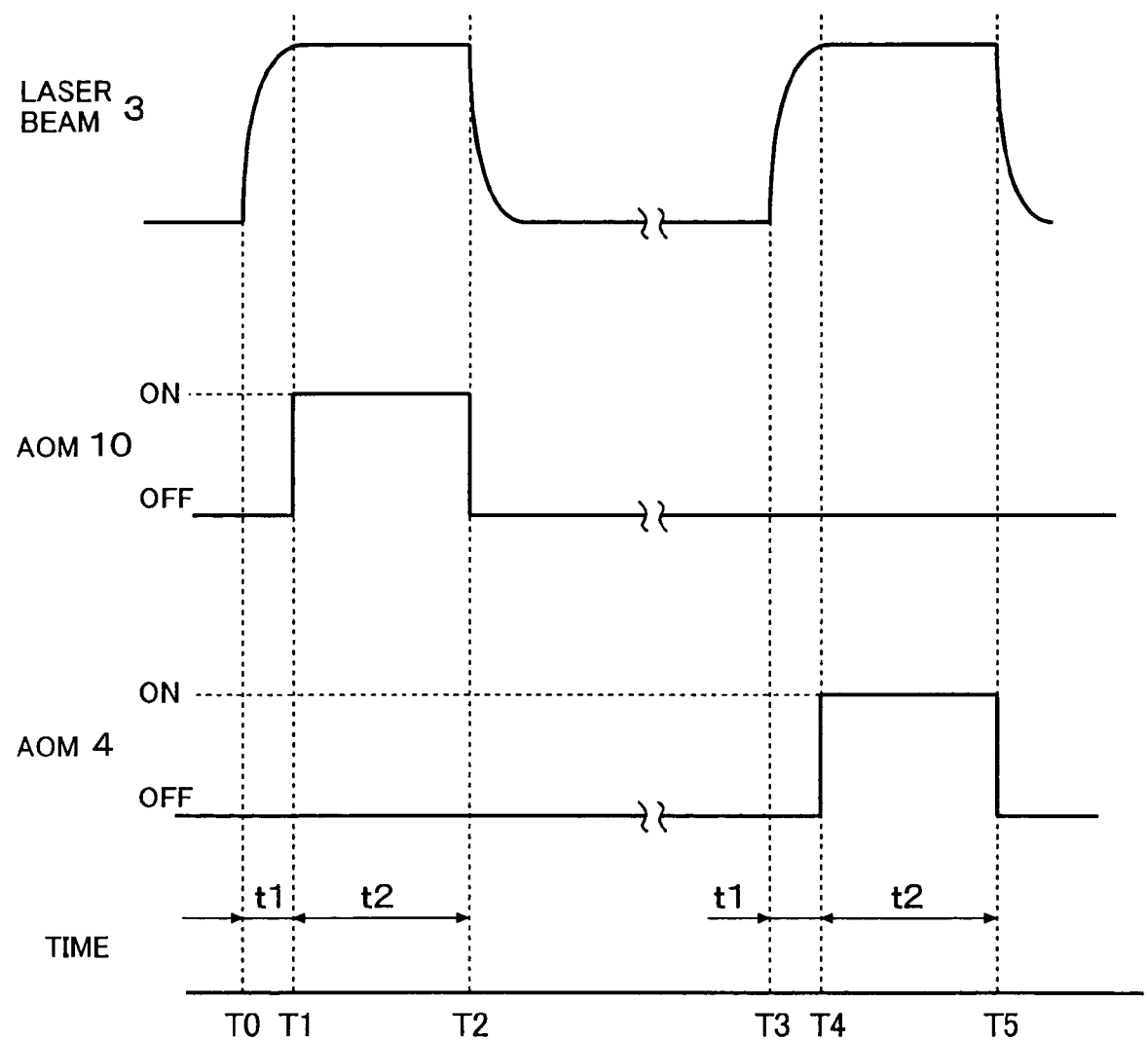
FIG. 5 is a time chart of the operation in the modification of the embodiment of the present invention.

FIG. 5 is a time chart of the operation in this embodiment. Incidentally, when there is no special instruction, the AOMs 4 and 10 are off.

For example, assume that the positioning of the laser positioning unit 6a is terminated prior to the positioning of the laser positioning unit 6b (time T0). The arbitration unit 5 receiving a positioning end signal from the laser positioning unit 6a operates the laser controller 2 so as to allow the laser oscillator 1 to output the laser beam 3. At the same time, the arbitration unit 5 starts to measure lapsed time t. Since the AOMs 4 and 10 are off, the laser beam 3 is passed through the AOMs 4 and 10 and put into the laser stopper 11. As soon as the lapsed time t reaches time t1 required for the intensity of the laser beam 3 to be substantially constant (time T1), the arbitration unit 5 turns on the AOM 10. As a result, the laser beam 3 is positioned by the laser positioning unit 6a so as to enter a portion to be machined. When irradiation time t2 has passed since the time T1 (time T2), the arbitration unit 5 turns off the AOM 10. Subsequently, in the same manner, irradiation with the laser beam 3 is repeated a specified number of times. When irradiation with the laser beam 3 is completed thus, the laser positioning unit 6a starts the operation for positioning the optical path of the laser beam 3a in the next machining position.

Next, assume that the positioning of the laser positioning unit 6b is terminated (while the laser positioning unit 6a is busy with positioning) (time T3). The arbitration unit 5 receiving a positioning end signal from the laser positioning unit 6b operates the laser controller 2 so as to allow the laser oscillator 1 to output the laser beam 3. The laser beam 3 is passed through the AOMs 4 and 10 and put into the laser stopper 11. As soon as the lapsed time t reaches the time t1 (time T4), the arbitration unit 5 turns on the AOM 4. As a result, the laser beam 3 is positioned by the laser positioning unit 6b so as to enter a portion to be machined. When the irradiation time t2 has passed since the time T4 (time T5), the arbitration unit 5 turns off the AOM 4. Subsequently, in the same manner, irradiation with the laser beam 3 is repeated a specified number of times. When irradiation with the laser beam 3b is completed thus, the laser positioning unit 6b starts the operation for positioning the optical path of the laser beam 3b in the next machining position.

The aforementioned operation is repeated till machining is completed.

In such a manner, the laser beam 3 having substantially constant intensity is supplied to each portion to be machined. Thus, the machining quality becomes uniform.

Incidentally, description has been made on a two-axis laser machine having two machining heads. However, not to say, the number of machining heads can be further increased as described above.

With such processing, laser positioning units disposed in respective axes are operated independently of each other, and a laser beam is supplied to one of the axes whose optical path has been positioned. Thus, even when the machining positions of the respective axes are different from each other, the wait time can be minimized so that the machining efficiency can be improved.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

What is claimed is:

1. A multi-axis laser machine comprising:
a laser oscillator for outputting a laser beam;
a deflection unit for switching a plurality of optical paths for said laser beam;
laser positioning units disposed on said optical paths respectively, the number of said laser positioning units being equal to the number of said optical paths, said laser beam being supplied to any one of said laser positioning units to thereby perform machining; and
an arbitration unit for controlling said laser positioning units independently of one another so as to perform machining at different positions from one another, wherein when said laser positioning units do not finish positioning at a same time, said arbitration unit controls a supply of said laser beam such that said laser beam is supplied to one of said laser positioning units which has finished positioning and is not supplied to an other of said laser positioning units which has not finished positioning, and wherein when said laser positioning units finish positioning simultaneously, said arbitration unit controls said supply of said laser beam to a plurality of laser positioning units in a predetermined sequence.

2. A method for machining with a multi-axis laser machine including a laser oscillator for outputting a laser beam, a deflection unit for switching a plurality of optical paths for said laser beam, and laser positioning units disposed on said optical paths respectively, the number of said laser positioning units being equal to the number of said optical paths, said laser beam being supplied to any one of said laser positioning units to thereby perform machining, said method comprising the steps of:
operating said laser positioning units independently of one another by an arbitration unit so as to perform machining at different positions from one another; and
arbitrating a supply of said laser beam to said laser positioning units by said arbitration unit, wherein when said laser positioning units do not finish positioning at a same time, said arbitration unit controls a supply of said laser beam such that said laser beam is supplied to one of said laser positioning units as soon as said laser positioning unit finishes positioning and is not supplied to an other of said laser positioning units which has not finished positioning, and wherein when said laser positioning units finish positioning simultaneously, said arbitration unit controls said supply of said laser beam to a plurality of laser positioning units in a predetermined sequence.

3. A recording medium recording a computer-readable control program for controlling a multi-axis laser machine including a laser oscillator for outputting a laser beam, a deflection unit for switching a plurality of optical paths for said laser beam, and laser positioning units disposed on said optical paths respectively, the number of said laser positioning units being equal to the number of said optical paths, said laser beam being supplied to any one of said laser positioning units to thereby perform machining, said control program including the steps of:

operating said laser positioning units independently of one another by an arbitration unit so as to perform machining at different positions from one another;

arbitrating a supply of said laser beam to said laser positioning units by said arbitration unit, wherein when said laser positioning units do not finish positioning at a same time, said arbitration unit controls a supply of said laser beam such that said laser beam is supplied to one of said laser positioning units as soon as said laser positioning unit finishes positioning and is not supplied to an other of said laser positioning units which has not finished positioning, and wherein when said laser positioning units finish positioning simultaneously, said arbitration unit controls said supply of said laser beam to a plurality of laser positioning units in a predetermined sequence;

said control program being executably written in said recording medium so as to be readable by a computer.

* * * * *